US012431767B2

(12) United States Patent
Vanhee et al.

(10) Patent No.: US 12,431,767 B2
(45) Date of Patent: Sep. 30, 2025

(54) ELECTRIC MACHINE WITH A COOLING ASSEMBLY

(71) Applicant: Dana Belgium N.V., Flanders (BE)

(72) Inventors: Steven Vanhee, Hooglede (BE); Joachim Druant, Houthulst (BE)

(73) Assignee: DANA BELGIUM N.V., Bruges (BE)

( * ) Notice: Subject to any disclaimer, the term of this patent is extended or adjusted under 35 U.S.C. 154(b) by 295 days.

(21) Appl. No.: 18/052,106

(22) Filed: Nov. 2, 2022

(65) Prior Publication Data

US 2024/0146154 A1    May 2, 2024

(51) Int. Cl.
*H02K 9/19*      (2006.01)
*H02K 9/193*    (2006.01)
*H02K 9/26*      (2006.01)
*B60L 50/60*    (2019.01)

(52) U.S. Cl.
CPC ............. *H02K 9/193* (2013.01); *H02K 9/26* (2013.01); *B60L 50/60* (2019.02)

(58) Field of Classification Search
CPC ............ H02K 9/193; H02K 9/26; H02K 1/20; H02K 1/32; H02K 15/12; H02K 9/19; H02K 5/203; H02K 5/207; H02K 9/06; H02K 9/20; B60L 50/60
See application file for complete search history.

(56) References Cited

U.S. PATENT DOCUMENTS

| | | | |
|---|---|---|---|
| 2011/0181138 A1* | 7/2011 | Matsumoto | H02K 9/08 310/59 |
| 2013/0119830 A1* | 5/2013 | Hautz | H02K 9/00 310/60 R |
| 2013/0221772 A1 | 8/2013 | Miyamoto et al. | |
| 2014/0265657 A1* | 9/2014 | Raczek | H02K 9/19 310/54 |
| 2019/0341830 A1* | 11/2019 | Anghel | H02K 9/19 |
| 2021/0044172 A1 | 2/2021 | Hombsch et al. | |
| 2022/0014067 A1 | 1/2022 | Wittmann et al. | |
| 2022/0239170 A1* | 7/2022 | Bradfield | H02K 1/20 |
| 2023/0187999 A1* | 6/2023 | Wang | H02K 11/30 310/54 |
| 2023/0223801 A1* | 7/2023 | Druant | H02K 1/20 310/54 |

FOREIGN PATENT DOCUMENTS

EP      3522338 A1 *   8/2019    ............ H02K 1/32

OTHER PUBLICATIONS

"Breather, N." Oxford English Dictionary, Oxford UP, Mar. 2024, https://doi.org/10.1093/OED/5656352238. (Year: 2024).*

* cited by examiner

*Primary Examiner* — Thomas Truong
(74) *Attorney, Agent, or Firm* — McCoy Russell LLP

(57) ABSTRACT

Systems and methods for electric machine cooling. The electric machine, in one example, includes a rotor that includes an outer circumferential surface with one or more spiral grooves, a stator that circumferentially surrounds the rotor and includes end windings, and an air passage radially extending from the stator to an air gap between the stator and the rotor. The electric machine further includes a cooling assembly configured to spray a coolant towards the end windings.

20 Claims, 3 Drawing Sheets

ELECTRIC MACHINE WITH A COOLING ASSEMBLY

TECHNICAL FIELD

The present disclosure relates to an electric machine that drives airflow through the air gap and includes a cooling assembly.

BACKGROUND AND SUMMARY

In electric motors, such as electric motors in electric vehicle (EV) applications, cooling systems has been used in an attempt to achieve greater motor efficiency. For instance, oil may be directed onto stator end windings to increase motor efficiency. After the oil spray hits the end windings it is collected into a sump. However, some of the oil spray may enter the air gap between the rotor and the stator. Oil in the air gap increases drag losses of the motor, thereby driving down efficiency.

US 2013/0221772 A1 to Miyamoto et al. discloses a cooling structure for an electric motor. The cooling structure includes a rotor shaft with an internal passage that radially distributes coolant to passages in the rotor core. The coolant that is directed through the rotor core may make its way into the air gap between the rotor and stator, thereby increasing the motor's drag losses and driving down motor efficiency. Further, Miyamoto's cooling structure may not deliver a targeted amount of coolant to the end windings, thereby constraining the motor's efficiency. Miyamoto's motor applicability may be constrained to platforms that do not demand a relatively high efficiency.

To overcome at least some of the abovementioned issues the inventors developed an electric machine. The electric machine includes, in one example, a rotor that includes an outer circumferential surface with one or more spiral grooves. The electric machine further includes a stator that circumferentially surrounds the rotor and includes end windings. The electric machine even further includes an air passage which radially extends from the stator to an air gap between the stator and the rotor. Still further, the electric machine includes a cooling assembly configured to spray a coolant (e.g., oil) towards the end windings. In one example, the one or more spiral grooves may be formed in a stack of rotor laminations. The spiral grooves passively generate airflow through the air gap during machine operation, thereby reducing the chance of coolant entering the gap and increasing drag losses. Consequently, the machine's efficiency may be increased in comparison to previous motor that do not constrain the amount of cooling oil entering the air gap.

In one example, the electric machine may further include a breather positioned at an inlet of the air passage. In this way, a target airflow rate in the air gap is achieved, further reducing the amount of coolant entering the air gap.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An electric machine, is described herein, that includes a cooling assembly that cools stator end windings and is designed to drive airflow axially outward through the air gap to reduce the amount of coolant (e.g., oil) that enters the air gap. The cooling and airflow features work in conjunction to increase motor efficiency by cooling end windings while reducing the chance of the coolant used for end winding cooling entering the air gap. To achieve this air gap airflow pattern, the rotor includes spiral grooves in an outer circumferential surface as well as an air passage that radially extends through the stator. To elaborate, the spiral grooves may be formed in the outer circumferential surface of a stack of rotor laminations. The electric machine further includes a cooling assembly that sprays coolant (e.g., oil) towards the stator end windings, to remove heat from the windings and increase motor efficiency. In this way, the efficiency gains made via stator ending winding cooling may not be significantly diminished from the losses caused by the coolant entering the air gap. The electric machine may further include a breather at the inlet of the air passage. The breather allows a desired amount of airflow to be generated through the air gap.

Figure 1A:
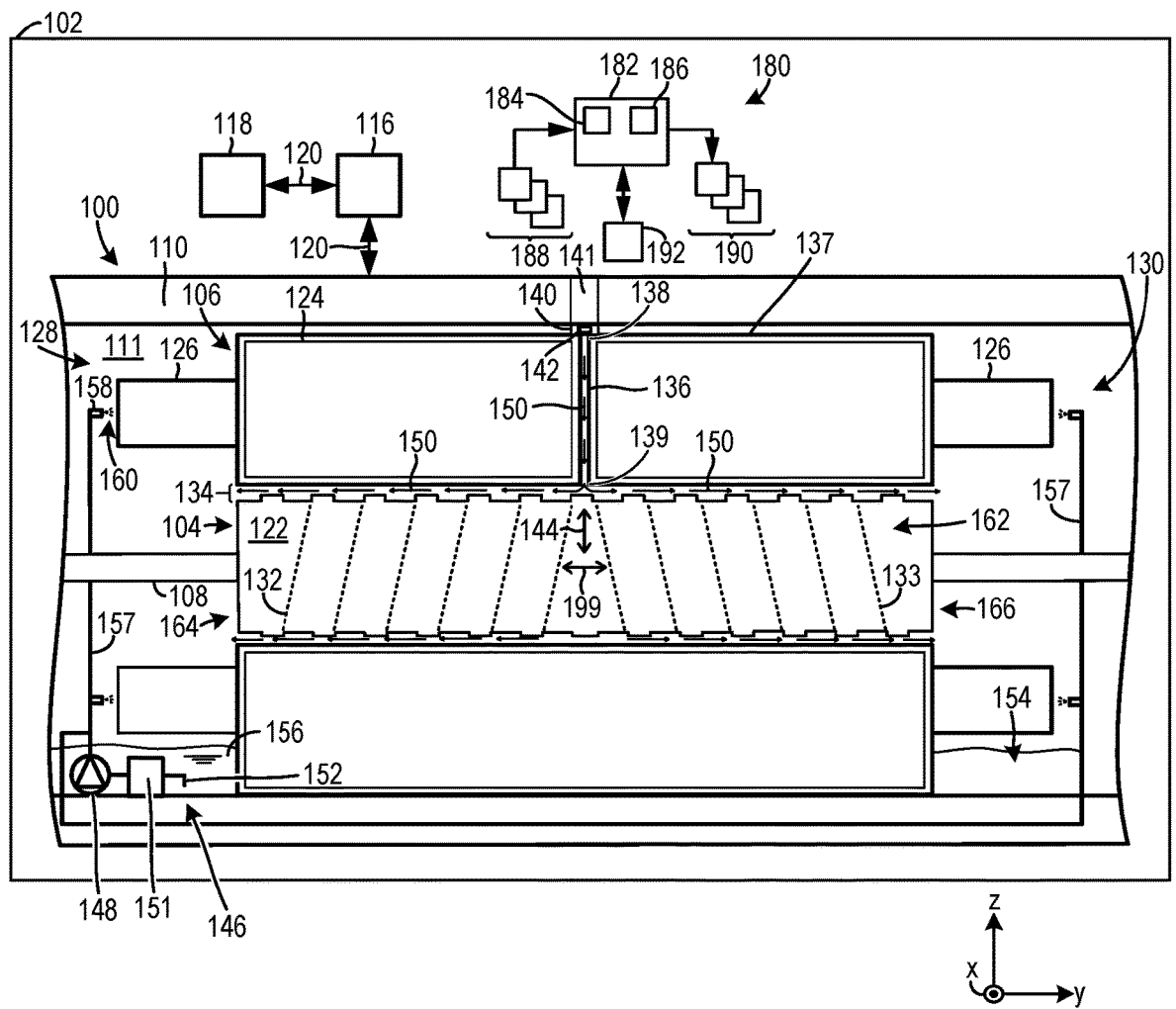
FIG. 1A shows a system with an electric machine.
Figure 1B:
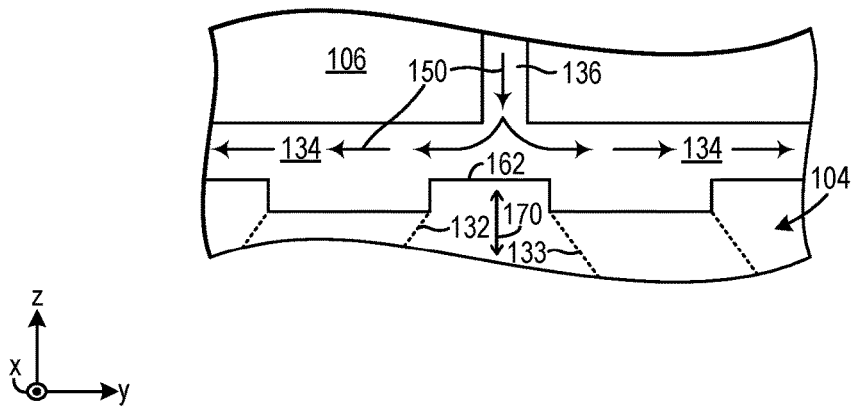
FIG. 1B shows a detailed view of a section of the electric machine, depicted in FIG. 1A.
Figure 2A:
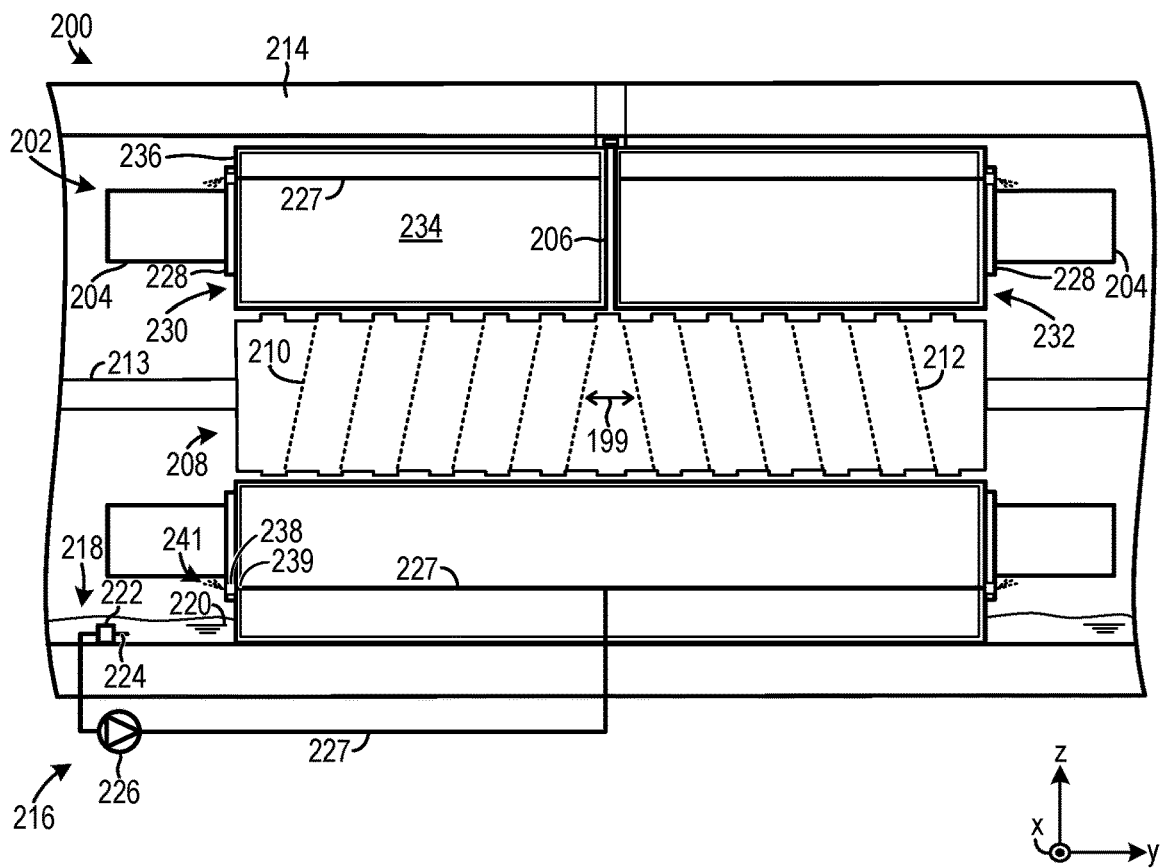
FIG. 2A shows another example of an electric machine.
Figure 2B:
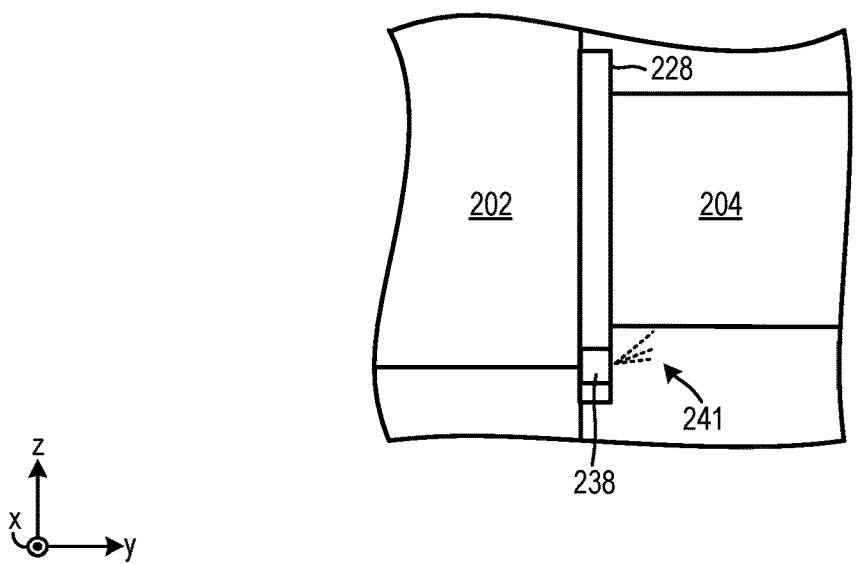
FIG. 2B shows a detailed view of a spray ring in the stator of the electric machine, depicted in FIG. 2A.
Figure 3A:
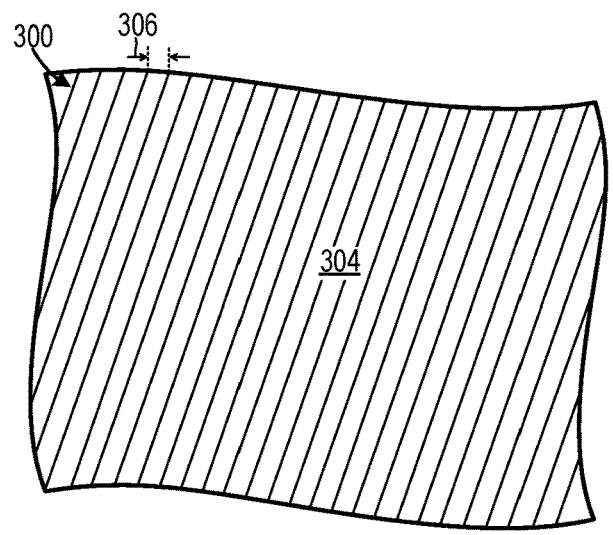
FIGS. 3A-3C show examples of spiral grooves that are included in an electric machine rotor.
Figure 3B:
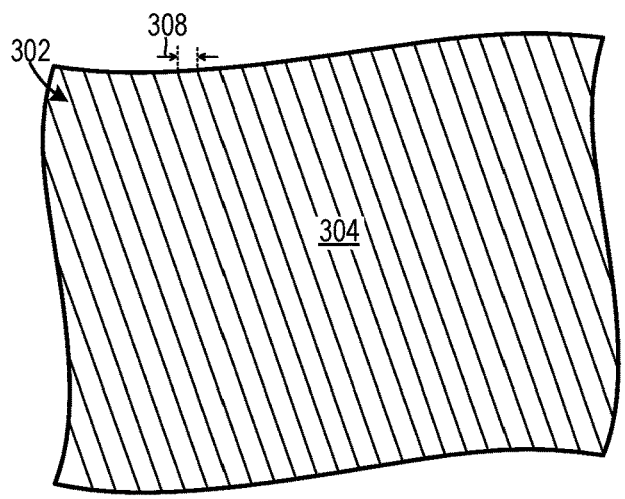
Figures 3C, 3D:
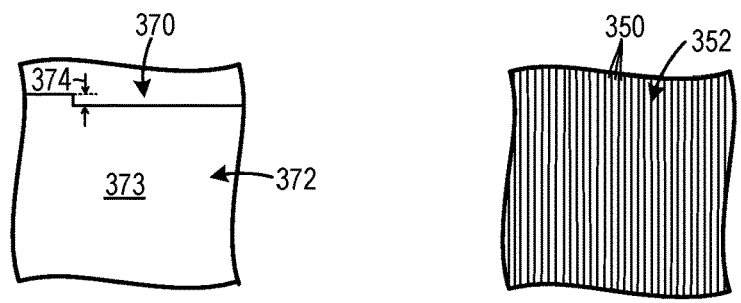
FIG. 3D shows an example of a rotor lamination stack.

FIGS. 1A-1B show a first example of an electric machine with a cooling assembly and spiral grooves that facilitate an increase in machine efficiency. FIGS. 2A-2B shows a second example of an electric machine with an alternate cooling assembly configuration. FIGS. 3A-3C show examples of spiral grooves that may be included in a rotor and are designed to drive airflow through the air gap. FIG. 3D shows an example of a rotor lamination stack.

FIG. 1A shows an illustration of an electric machine 100. The electric machine 100 may be designed as an electric motor (e.g., motor-generator) and may be included in a system 102 which may take a variety forms. For instance, the electric machine 100 may be incorporated into an electric drive of an electric vehicle (EV). In the EV example, the EV may be an all-electric vehicle (e.g., a battery electric vehicle (BEV)), in one example, or a hybrid electric vehicle (HEV), in another example. For instance, the electric machine may be mechanically coupled to a transmission (e.g., gearbox) that is coupled to drive wheels using one or more differentials for example. Further, in the EV example, the electric machine may be a traction motor that delivers mechanical power to drive wheels. In the HEV example, the electric machine may be included in an electric axle and an internal combustion engine may provide motive power to another drive axle. However, the motor may be used in other suitable systems (e.g., stationary systems), in other examples, such as in industrial machines, agricultural systems, mining systems, and the like.

The electric machine 100 includes a rotor 104 that electromagnetically interacts with a stator 106 to drive rotation of a rotor shaft 108 that is included in the rotor. The stator

106 at least partially surrounds the rotor 104. As such, the electric machine 100 may be a radial flux style motor.

The electric machine 100 in the illustrated example includes a housing 110. The housing 110 may form an enclosure (e.g., a sealed enclosure) 111 that contains stator end windings, cooling assembly components, and the like, which are expanded upon herein. The housing may include an electrical interface. The electrical interface may be a multi-phase electrical interface with multiple electrical connectors. The electrical interface may be three-phase interface in one example or a six or nine phase interface, in other examples. More generally, the electric machine 100 may be a multi-phase alternating current (AC) machine. However, in other examples, the electric machine 100 may be a direct current (DC) machine.

As illustrated in FIG. 1, the electric machine 100 may be electrically coupled to an inverter 116. The inverter 116 is designed to covert direct current (DC) power to alternating current (AC) power and vice versa. As such, the electric machine 100 may be an AC electric machine, as indicated above. However, in other examples, the electric machine 100 may be a DC electric machine (as previously indicated), and the inverter 116 may therefore be omitted from the system 102. The inverter 116 may receive electric energy from one or more energy storage device(s) 118 (e.g., traction batteries, capacitors, combinations thereof, and the like). Arrows 120 signify the electric energy transfer between the electric machine 100, the inverter 116, and the energy storage device(s) 118 that may occur during different modes of system operation.

The rotor 104 may include a core 122 with a stack of laminations. An example, of a lamination stack 350 in a rotor 352 is depicted in FIG. 3D. In the stack, laminations, that may be formed of steel, may be sequentially arranged and coupled (e.g., bonded and/or welded) to one another. Further, the rotor lamination stack may include teeth.

Continuing with FIG. 1A, the stator 106 may include a core 124 through which windings extend. These windings protrude from the stator core on either axial end to form end windings 126. The end windings may be positioned on opposing axial sides 128 and 130 of the electric machine. Further, the stator core 124 may include a stack of laminations which may include teeth and gaps at an inner periphery. The stator core 124 and end windings 126 are schematically illustrated. However, it will be understood that they have greater structural complexity.

The end windings 126 generate heat during machine use. As such, cooling of the end windings to increase motor efficiency may be desired. A cooling assembly 146 is provided to remove heat from the end windings 126.

The cooling assembly 146 in the illustrated example, includes a coolant pump 148 and a filter 151 that includes a pick-up 152 in a sump 154. The sump 154 is positioned in an internal enclosure of the electric machine 100 and is contoured to collect coolant 156 that is sprayed at the end windings 126. The coolant used in the cooling assembly 146 may specifically be oil (e.g., natural and/or synthetic oil), in one example. However, other suitable types of coolant have been contemplated. The coolant pump 148 is shown incorporated into the housing 110 of the electric machine. However, the coolant pump may be spaced away from the electric machine and therefore positioned external to the electric machine's housing, in alternate examples.

To direct coolant towards the end windings, the cooling assembly 146 may include coolant conduits 157 and nozzles 158. Additional or alternative coolant routing techniques may be used in other examples. For instance, spray rings, expanded upon herein with regard to FIGS. 2A and 2B may be used to direct coolant at the end windings 126 for cooling.

The conduits 157 may at least partially extend through the housing 110 and/or other suitable portions of the machine. Further, the nozzles 158 may be positioned on opposing axial sides of the stator 106. To elaborate, the nozzles may spray coolant 160 inwards toward the end windings in one example. Additional or alternative nozzles may spray coolant in an outward radial direction to cool the end windings. For instance, additionally or alternatively, channels (e.g., nozzles) in spray rings which are coupled to the stator core may be used to spray coolant onto the end windings.

To generate airflow in the air gap 134 the rotor 104 (e.g., rotor core 122) includes spiral grooves 132, 133 on an outer circumferential surface 162. To elaborate, a first axial side 164 of the rotor 104 may include the first spiral groove 132 that drives airflow axially towards the first axial side 128 of the machine and a second axial side of the rotor may include another spiral groove that is differently shaped from the first spiral groove and drives airflow axially towards the second axial side 166 of the machine. However, in other examples, the rotor 104 may include a sole spiral groove that runs from one axial end of the rotor to the opposing end. Incorporating the spiral grooves in the rotor allow an air gap airflow pattern to be generated which decreases the chance of coolant (e.g., oil) ingress in to the air gap. Consequently, significant drops in machine efficiency caused by drag losses may be avoided. Further, the spiral grooves 132, 133 allow the airflow to be passively generated during machine operation, thereby increasing machine longevity when compared to systems that may include components which are actively controlled to drive airflow through the air gap.

The spiral grooves 132 and 133 are depicted via dashed lines as an abstracted visual representation of the grooves. However, it will be appreciated that the grooves in FIG. 1A are not illustrated to scale. The specific geometry of the spiral grooves that may be used in the electric machines described herein is expanded upon with regard to FIGS. 3A and 3B.

The spiral groove 132 may have a profile that generates airflow through the air gap 134 towards the axial side 128 of the electric machine 100 during machine operation. Conversely, the spiral groove 133 may have a profile that generate airflow through the air gap 134 towards the axial side 130 of the electric machine 100 during machine operation. In this way, the airflow in the gap has a pattern that reduces the ingress of coolant into the gap and expels any coolant that may have entered the gap.

The electric machine 100 further includes an air passage 136 that radially extends through the stator 106 (e.g., the stator core 124) and opens into the air gap 134. To elaborate, the air passage 136 extends from an outer diameter 137 of the stator 106 to the air gap 134. To air passage 136 may therefore include an inlet 138 and an outlet 139. At the inlet 138, a breather 140 may be positioned. The breather 140 allows a desired amount of airflow to be achieved through the air passage 136 and the air gap 134. The breather 140 may include an air filter 142 which is designed to capture oil droplets and reduce the amount of oil in the air entering the air passage 136. The outlet 139 of the air passage 136 may be adjacent to a center line 144 of the rotor core 122 to allow the air to be symmetrically directed outward towards opposing axial ends of the machine 100.

The breather 140 may be constructed out of a polymer (e.g., plastic) and/or aluminum. Further, in one example, the breather may be constructed as a plate at or near the axial mid-point of the stator lamination stack. As such, the breather plate may be axially positioned between stator laminations. In such an example, the plate may have a breather channel between the air gap and the stator's outer diameter. The machine may further include a breather vent 141 in the housing 110. The breather vent may extend radially through the housing, in one example.

Additional air passages may be directed through the stator to allows a greater amount of air to be directed through the air gap, in operating environments where higher airflow is desired.

Arrows 150 denote the general direction of airflow through the air passage 136 and the air gap 134. As shown, air travels from the vent 141 into the breather 140 and through the breather 140 into the inlet 138 of the air passage 136. Then air travels radially inward towards the rotational axis 199 of the machine through the air passage 136 and then into the air gap 134 by way of the outlet 139 of the air passage 136. In the illustrated example, the air then moves axially outward in opposing directions towards the opposing axial sides 128, 130 of the of the machine 100. In this way, an airflow pattern that reduces the likelihood of coolant (e.g., oil) ingress into the air gap and expels coolant that may have entered the air gap.

The system 102 may additionally include a control subsystem 180 with a controller 182. The controller 182 includes a processor 184 and memory 186. The memory 186 may hold instructions stored therein that when executed by the processor 184 cause the controller 182 to perform the various methods, control techniques, and the like, described herein. The processor 184 may include a microprocessor unit and/or other types of circuits. The memory 186 may include known data storage mediums such as random access memory, read-only memory, keep alive memory, combinations thereof, and the like.

The controller 182 may receive various signals from sensors 188 positioned in different locations in the system 102. The sensors 188 may include an electric machine speed sensor, energy storage device temperature sensor(s), an energy storage device state of charge sensor(s), an inverter power sensor, and the like. The controller 182 may also send control signals to various actuators 190 coupled at different locations in the system 102. For instance, the controller may send signals to the inverter 116 to adjust the rotational speed of the electric machine 100. In another example, the controller 182 may send a command signal to the electric machine 100 and/or the inverter 116 and in response motor speed may be adjusted. The other controllable components in the system 102 may function in a similar manner with regard to command signals and actuator adjustment.

The system 102 may additionally include one or more input device(s) 192 (e.g., an accelerator pedal, a brake pedal, a console instrument panel, a touch interface, a touch panel, a keyboard, combinations thereof, and the like). The input device(s) 192, responsive to user input, may generate a motor speed adjustment request.

An axis system is provided in FIG. 1A, as well as FIGS. 1B-2B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Rotational axes 199 of the electric machine 100 is further provided for reference in FIG. 1A as well as FIG. 2B. Cutting planes for the cross-sectional views shown in FIGS. 1A-1B as well as 2A-2B extend through the rotational axes 199.

FIG. 1B shows a detailed view of the air passage 136 and the air gap 134. The stator 106 is again shown along with the rotor 104 and the spiral grooves 132, 133 therein. The spiral grooves 132, 133 are formed (e.g., cut into) the circumferential surface 162. A flow pattern of the air traveling through the air passage 136 and the air gap 134 is again denoted via arrows 150. The arrows 150 denote the general direction of airflow. However, it will be understood that the airflow pattern has greater complexity, in practice. As shown in FIG. 1B, air is directed inward through the air passage towards the machine's rotational axis and then axially outwards away from the center 170 of the machine towards axially opposing ends of the machine. The spiral grooves 132, 133 may have a mirrored geometry to generate the axially outward airflow. In this way, the likelihood of coolant entering the air gap is significantly reduced and any coolant that has found its way into the gap is expelled therefrom. Consequently, machine drag losses are reduced.

FIG. 2A shows another example, of an electric machine 200. The electric machine 200 shown in FIG. 2A includes some components that are similar to the electric machine 100 shown in FIG. 1A. For instance, the electric machine 200 includes a stator 202 with end windings 204 and an air passage 206, a rotor 208 with spiral grooves 210 and 212 and a shaft 213, and a housing 214. Repeated description of the structure and functionality of these components is omitted for brevity.

A cooling assembly 216 in the machine depicted in FIG. 2A has an alternate configuration to the cooling assembly 146 depicted in FIG. 1A. To elaborate, the cooling assembly 216 includes a sump 218 with coolant 220 and a filter 222 with a pick-up 224. However, a pump 226 in the cooling assembly 216 is positioned external to the housing in the illustrated example. The pump may be alternatively incorporated into the electric machine. For instance, the pump may be coupled to the housing 214 at an external or internal location. Further, the pump 226 directs coolant through coolant passages 227. A portion of the coolant passages 227 traverse the stator 202 and are in fluidic communication with spray rings 228. The spray rings 228 are positioned on opposing axial sides 230 and 232 of a stator core 234. To elaborate, the spray rings 228 may be coupled (e.g., adhesively bonded, welded, press-fit, combinations thereof, and the like) to surfaces 236 of the stator 202. The spray rings 228 include channels 238. The channels 238 are in fluidic communication with a portion of the coolant passages 227. Specifically, outlets 239 of some of the channels 238 open into the channels 238 of the spray rings 228. The channels 238 may be profiled to generate a coolant spray 241 that is directed toward the end windings 204. Further, the spray rings 228 may have annular shapes that allow the end windings 204 to pass therethrough. The spray rings 228 may be coupled to opposing axial side surfaces (e.g., axial end faces) of the stator core 234.

A detailed view of one of the spray rings 228, the stator 202, and associated components is depicted in FIG. 2B. The channel 238 of the spray ring 228 is further shown in FIG. 2B. The channel 238 extends axially through the ring and directing the coolant radially inwards toward the end windings 204 in the form of the coolant spray 241. The other spray rings in the electric machine 200, shown in FIG. 2A may be constructed in a similar manner. In this way, coolant may be effectively directed towards the end windings.

FIGS. 3A and 3B depict examples of spiral grooves 300 and 302, respectively. These spiral grooves 300, 302 may be positioned on opposing axial sides of a rotor 304 in which they are formed. In this way, air flow may be generated in a direction that is axially outward towards the axial ends of the rotor lamination stack. Consequently, the chance of coolant entering the air gap is reduced.

The pitch 306 of the spiral groove 300 is illustrated in FIG. 3A. Likewise, the pitch 308 of the spiral groove 302 is illustrated in FIG. 3B. Each of the pitches 306 and 308 may be less than or equal to 1.0 centimeters (cm). In this way, a targeted amount of airflow through the air gap may be generated that strategically reduces the amount of coolant that enters the air gap. However, in other examples, the pitches 306 and 308 may not be equivalent.

The pitches 306 and/or 308 of the spiral grooves 300 and 302, respectively may remain constant along the axial length of the rotor 304. However, in other examples, the pitches may be progressively increase or decrease in an axially outward direction away from the longitudinal center of the machine to enable the flow dynamics of the airflow through the gap to be tuned, if desired.

FIG. 3C shows another example of a spiral groove 370 of a rotor 372 with a core 373. The spiral groove 370 is an example of any of the previously described spiral grooves. The spiral groove 370 has a depth 374 that extends radially inward into the rotor core. To elaborate, the groove may be cut (e.g., milled) or otherwise formed in the rotor core's outer circumferential surface. The depth 374 may be less than or equal to 0.1 millimeters (mm) to enable a desired amount of airflow to be generated in the air gap without unduly impacting the electromagnetic characteristics of the rotor.

FIGS. 1A-3D provide for a method used to rotate a rotor in an electric machine and spray a coolant towards stator end windings, in one example. In this example, the electric machine includes a rotor with an outer circumferential surface that has multiple spiral groove. The electric machine further includes an air passage which radially extends from the stator to an air gap between the stator and the rotor.

The technical effect of the motor cooling system operating methods described herein is to increase machine efficiency by reducing drag losses caused by coolant (e.g., oil) in the machine's air gap.

FIGS. 1A-3D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such.

The invention will be further described in the following paragraphs. In one aspect, an electric machine is provided that comprises a rotor that includes an outer circumferential surface with one or more spiral grooves; a stator that circumferentially surrounds the rotor and includes end windings; an air passage radially extending from the stator to an air gap between the stator and the rotor; and a cooling assembly configured to spray a coolant towards the end windings.

In another aspect, a method for operation of an electric machine is provided that comprises rotating a rotor in the electric machine; and spraying a coolant towards end windings of a stator; wherein the electric machine includes: a rotor that includes an outer circumferential surface with one or more spiral grooves; the stator that circumferentially surrounds the rotor and includes end windings; and an air passage radially extending from the stator to an air gap between the stator and the rotor.

In yet another aspect, an electric motor-generator is provided that comprises a rotor that includes an outer circumferential surface with plurality of laminations that are formed in a stack; wherein an outer surface of the stack of laminations includes one or more spiral grooves configured to generate airflow through a gap between the rotor and a stator; wherein a stator that circumferentially surrounds the rotor and includes end windings; an air passage radially extending through the stator to the air gap; and a cooling assembly that is configured to spray a coolant towards the end windings.

In any of the aspects or combinations of the aspects, the one or more spiral grooves may be formed in a stack of rotor laminations.

In any of the aspects or combinations of the aspects, the electric machine may further comprise a breather positioned at an inlet of the air passage.

In any of the aspects or combinations of the aspects, the inlet of the air passage may be positioned adjacent to an outer surface of the stator.

In any of the aspects or combinations of the aspects, the breather may include a filter.

In any of the aspects or combinations of the aspects, the one or more spiral grooves may have a depth of less than 0.1 millimeters (mm).

In any of the aspects or combinations of the aspects, the one or more spiral grooves may have a pitch that is less than or equal to 1.0 centimeters (cm).

In any of the aspects or combinations of the aspects, the cooling assembly may include a plurality of nozzles that spray the coolant toward the end windings.

In any of the aspects or combinations of the aspects, the cooling assembly may include a plurality of spray rings that are coupled to a stator core and directs the coolant towards the end windings.

In any of the aspects or combinations of the aspects, the coolant may be oil.

In any of the aspects or combinations of the aspects, the electric machine may be a traction motor in an electric drive of a vehicle.

In any of the aspects or combinations of the aspects, the cooling assembly may include a sump configured to collect the coolant.

In any of the aspects or combinations of the aspects, the electric machine may further comprise a pump configured to receive coolant from the sump, wherein the pump may be incorporated within the electric machine.

In any of the aspects or combinations of the aspects, the electric machine may include a breather positioned at an inlet of the air passage.

In any of the aspects or combinations of the aspects, the electric motor-generator may further comprise a breather positioned at an inlet of the air passage and including a filter.

In any of the aspects or combinations of the aspects, the spiral grooves may have a depth of less than 0.1 millimeters (mm) and a pitch that is less than or equal to 1.0 centimeters (cm).

In any of the aspects or combinations of the aspects, the traction motor-generator may be a multi-phase motor generator and wherein the stator is configured to electrically couple to an inverter.

In any of the aspects or combinations of the aspects, the cooling assembly may include a plurality of spray rings that are coupled to a stator core and directs the coolant towards the end windings.

In another representation, a motor cooling system is provided that comprises a rotor core that is formed of a stack of laminations with spiral depressions extending around a peripheral surface of the stack of laminations and configured to drive airflow through an air gap between the rotor core and the stator, where a radial air passage extends through the stator and opens into the air gap between a first axial end of the stack of laminations and a second axial end of the stack of laminations.

Note that the example control and estimation routines included herein can be used with various motor configurations. The control methods and routines disclosed herein may be stored as executable instructions in non-transitory memory and may be carried out by the control system including the controller in combination with the various sensors, actuators, and other system hardware in combination with the electronic controller. As such, the described actions, operations, and/or functions may graphically represent code to be programmed into non-transitory memory of the computer readable storage medium in the vehicle and/or driveline control system. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric machine, comprising:
    a rotor that includes an outer circumferential surface with a first spiral groove that drives airflow axially towards a first axial side of the rotor and a second spiral groove that drives airflow axially toward a second axial side of the rotor, wherein the second spiral groove is differently shaped than the first spiral groove;
    a stator that circumferentially surrounds the rotor and includes end windings;
    an air passage radially extending from an outer diameter of the stator to an air gap between the stator and the rotor; and
    a cooling assembly configured to spray a coolant towards the end windings.

2. The electric machine of claim 1, wherein the one or more spiral grooves are formed in a stack of rotor laminations.

3. The electric machine of claim 1, further comprising a breather positioned at an inlet of the air passage.

4. The electric machine of claim 3, wherein the inlet of the air passage is positioned adjacent to an outer surface of the stator.

5. The electric machine of claim 3, wherein the breather includes a filter.

6. The electric machine of claim 1, wherein the one or more spiral grooves have a depth of less than 0.1 millimeters (mm).

7. The electric machine of claim 1, wherein the one or more spiral grooves have a pitch that is less than or equal to 1.0 centimeters (cm).

8. The electric machine of claim 1, wherein the cooling assembly includes a plurality of nozzles that spray the coolant toward the end windings.

9. The electric machine of claim 1, wherein the cooling assembly includes a plurality of spray rings that are coupled to a stator core and directs the coolant towards the end windings.

10. The electric machine of claim 1, wherein the coolant is oil.

11. The electric machine of claim 1, wherein the electric machine is a traction motor in an electric drive of a vehicle.

12. The electric machine of claim 1, wherein the cooling assembly includes a sump configured to collect the coolant.

13. The electric machine of claim 12, further comprising a pump configured to receive coolant from the sump, wherein the pump is incorporated within the electric machine.

14. A method for operation of an electric machine, comprising:
rotating a rotor in the electric machine; and
spraying a coolant towards end windings of a stator;
wherein the electric machine includes:
the rotor that includes an outer circumferential surface with a first spiral groove and a second spiral groove that extend into a stack of laminations of the rotor, wherein the first spiral groove drives airflow axially towards a first axial side of the rotor and the second spiral groove drives airflow axially toward a second axial side of the rotor, and wherein the second spiral groove is differently shaped than the first spiral groove;
the stator that circumferentially surrounds the rotor and includes the end windings; and
an air passage radially extending from the stator to an air gap between the stator and the rotor.

15. The method of claim 14, wherein the electric machine includes a breather positioned at an inlet of the air passage.

16. An electric motor-generator, comprising:
a rotor that includes an outer circumferential surface with plurality of laminations that are formed in a stack;
wherein an outer surface of the stack of laminations includes a first spiral groove and a second spiral groove shaped into the stack of laminations of the rotor and configured to generate airflow through an air gap between the rotor and a stator, wherein the first spiral groove drives airflow axially towards a first axial side of the rotor and the second spiral groove drives airflow axially toward a second axial side of the rotor, and wherein the second spiral groove is differently shaped than the first spiral groove; and
wherein the stator circumferentially surrounds the rotor and includes the end windings;
an air passage radially extending through the stator to the air gap; and
a cooling assembly that is configured to spray a coolant towards the end windings.

17. The electric motor-generator of claim 16, further comprising a breather positioned at an inlet of the air passage and including a filter.

18. The electric motor-generator of claim 16, wherein the one or more spiral grooves have a depth of less than 0.1 millimeters (mm) and a pitch that is less than or equal to 1.0 centimeters (cm).

19. The electric motor-generator of claim 16, wherein the electric motor-generator is a multi-phase motor generator, and wherein the stator is configured to electrically couple to an inverter.

20. The electric motor-generator of claim 16, wherein the cooling assembly includes a plurality of spray rings that are coupled to a stator core and direct the coolant towards the end windings.

* * * * *